2,780,551

PROCEDURE FOR PRESERVING FOODS

Dante G. Guadagni, Lafayette, Calif., assignor to the United States of America as represented by the Secretary of Agriculture No Drawing. Application June 23, 1954,
Serial No. 438,886

7 Claims. (Cl. 99—193)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to and has among its objects the provision of novel procedures for preserving foods. In particular the invention is concerned with a process wherein a raw solid fruit or vegetable is subjected to a treatment involving a combination of steps including a mild heat treatment to cause partial enzyme inactivation followed by freezing whereby to produce a product which will maintain its fresh color, taste, and appearance even after prolonged storage under adverse conditions. Further objects and advantages of the invention will be evident from the description herein.

One of the problems in the food-freezing industry concerns the fact that many frozen fruits prepared by conventional techniques do not retain their natural color on storage. This situation is particularly aggravated in cases where the frozen product is subjected to increased temperatures, for example in shipping, handling in retail freezers, etc. This problem is further explained below using peaches as a typical example of a product which is subject to this undesirable change on storage.

In conventional practice frozen peaches are prepared as follows: The fresh peaches are washed, peeled, pitted, and then cut in halves or slices. The cut fruit is then placed in containers together with a quantity of syrup (sugar dissolved in water) containing ascorbic acid. Usually enough of the syrup is used to cover the fruit. The container is then sealed and subjected to freezing. It will be observed that if the product is stored under conditions permitting no rise above 0° F., the product will retain a natural bright color. However, in actual practice, it is impossible to prevent the temperature of the product from rising above 0° F., at least for short periods. Thus in shipment from producer to jobber or warehouse and to retail outlet, etc., it is inevitable that the product will be subjected to temperatures over 0° F. These rises in temperature even though not above freezing temperatures and even though of short duration exert a deleterious action and the fruit takes on a brown appearance—the severity of the browning being dependent on the length of time exposed to the increased temperature and the maximum temperature attained. The browning is not directly caused by the increased temperature but by the action of the enzymes in the fruit. The browning is usually mostly in the portion of the fruit at the top of the package and the explanation is that this portion of the fruit is floating above the level of the syrup and therefore the ascorbic acid in the syrup is not in contact with this portion of the fruit and hence cannot serve to inhibit the enzyme action as the ascorbic acid does in regard to the remainder of the fruit which is in actual contact with the syrup.

It has now been found that this problem of browning can be solved in a relatively simple but effective manner. In essence the procedure of this invention involves subjecting the fruit prior to freezing to a mild heat treatment sufficient only to inactivate the enzymes in the surface layers of the fruit. This superficial heat treatment is not to be confused with a blanching, sterilizing, or cooking treatment whereby the natural flavor of the product is altered. The heat treatment in accordance with this invention is so mild that the product is still essentially in a raw state and has the taste, color, and appearance of the raw fruit. By applying this superficial heat treatment prior to freezing, a superior product is obtained. Thus the product will not brown when exposed to such increased temperatures as are incident to the handling and sale of frozen foods. The important point is that the mild heat treatment has inactivated the enzymes in the surface layers of the fruit so that even in the portion of the fruit which is floating above the syrup, no browning can occur.

A more complete description of the preservation technique of this invention is as follows:

The fresh produce is first subjected to the usual preparatory steps such as washing, peeling, pitting, slicing, etc., all as well known in the art. The preparative steps to be used will of course depend on the nature of the produce and the type of product desired. For example fruit such as pears and apples are usually washed, peeled, cored, and sliced. Peaches and apricots are washed, peeled, pitted, and sliced. Small fruit such as berries, grapes, etc. are only washed. The invention can be applied to any type of solid comestible, examples being apples, pears, cherries, peaches, apricots, prunes, plums, grapes, berries, carrots, peas, beans, spinach, cauliflower, broccoli, sweet corn, etc. The invention is particularly adapted to the preservation of such types of foods as are consumed in the raw state, fruits, for example, since a feature of the invention is that although the food is preserved in a condition stabilized against color and flavor deterioration, the food is still in a raw state.

The food units, for example the whole fruit or pieces thereof, in their raw condition are then subjected to the superficial heat treatment to cause inactivation of the enzymes located at and near the surface of the food pieces. This heat treatment may be accomplished in any of several ways as by contacting the food pieces with steam or other hot gases, hot water or other edible liquid, or by exposing the food to radiant heat, etc. The preferred method of heat treatment involves contacting the food pieces with a hot edible liquid, for instance hot syrup. As an example of such a treatment, the food pieces are immersed in a bath of hot syrup and kept in the bath until the enzymes in the surface layers of the food are inactivated. The treated food is then removed from the bath and frozen.

Usually it is preferred to contact the food with the hot edible liquid in the container in which the food is packaged. In such case the units of raw food are placed in the container which may be a can, glass jar, carton, etc. The hot edible liquid is then poured over the food and the container is closed. The container is then rotated or otherwise agitated to ensure intimate contact between the food units and the liquid. In some cases the heat from the hot liquid will be sufficient to produce the desired degree of enzymatic inactivation and no supplemental heating is needed. Where the heat supplied by the liquid is not sufficient, the containers may be subjected to additional heat as by contacting them with steam or immersing them in a bath of hot water. Agitation during this period is also desirable to obtain a more rapid and uniform heat treatment of the food within the containers.

In the mild heat treatment the specific conditions of temperature and time to be used will vary depending on many factors such as the original temperature of the fruit, the temperature of the added liquid, the condition of the fruit—that is, whether it is peeled or not, the size of the food units, the nature of the food in question, the size of the container, and so forth. In any event, the aim of the heat treatment is to effectuate an inactivation only of the enzymes in the surface layers of the food units. The treatment must not be so severe as to cause an inhibition of the enzymes throughout the units nor to cause sterilization or cooking of the food. It is to be emphasized that the mild heat treatment in accordance with this invention does not materially alter the nature of the food so that it still has the taste, color, and appearance of the fresh food. On the contrary an intensive heat treatment which causes complete inactivation of enzymes or sterilization or cooking of the food would so drastically change the nature of the food that it would be a typical canned product and would not have the color, taste, nor appearance of the fresh food.

In any particular case the proper temperature and time required for the mild heat treatment may be ascertained by subjecting several pilot samples of the food in question to several different conditions of time and temperature. The products may then be examined to determine the degree of enzyme inactivation. A convenient method of doing this is to slice one of the food units in half and then apply the reagent catechol in 1% aqueous solution to the cut surface. By the different color of the various portions of the cut surface, the depth of enzyme inactivation can be observed. Thus the portion of the surface wherein the enzymes are inactivated will retain its natural color whereas the portion of the surface containing active enzymes will turn black or shades thereof. Obviously other analytical procedures may be used as well known in the field of enzyme chemistry. Usually the conditions of temperature and time during the mild heat treatment are so regulated that the enzymes are inactivated to the depth of about 0.1 to about 0.25 inch into the surface of the food units. In many cases such results are achieved by subjecting the packed containers to such heating conditions that the liquid surrounding the food units is brought to a temperature within the range from about 150° F. to about 212° F., such heat being applied for a period from about 10 seconds at the higher temperatures in the above range to about 10 minutes at the lower temperatures in the above range.

After the heat treatment is completed the containers are preferably cooled to prevent further exposure of the contents to heat. This cooling may be accomplished by spraying the containers with cold water or rolling them through a trough through which cold water is circulated.

The cooled containers are then placed in a freezer to freeze the contents and the frozen product is maintained in frozen storage (about 0° F.) until ready for consumption.

The edible liquid used as the heating medium in the mild heat treatment step may be varied depending on the nature of the food being preserved. Usually for vegetables a solution of salt (sodium chloride) in water is preferred. Thus the liquid may be, for example, a 0.5 to 2% solution of salt in water. In the case of fruits a syrup is preferred, for instance a 30 to 60% solution of sucrose in water. The edible liquid may contain added flavoring agents as desired, for example, citric acid, fruit juices, volatile fruit essences, spices, condiments or other nutritive materials such as vitamins, proteins, mineral salts, etc. Preferably the edible liquid should contain ascorbic acid as an enzyme inhibitor to extend the storage period during which the final products will remain free from discoloration. A minor amount of ascorbic acid, on the order of 0.01 to 0.1% of the liquid, is usually employed.

The use of an edible liquid in connection with the process of this invention has several advantages. Primarily, the liquid acts as a heat transfer medium within the container so that rapid and uniform heating of the food units is made possible. It is evident that if no liquid were used it would be impossible to obtain a mild heating of the units in the center of the container without at the same time causing a cooking of the food in the areas near the container walls. In my process during the heat treatment the liquid circulates in the can by thermal currents or by use of mechanical rotation applied to the containers whereby the same degree of heat is applied to each unit within the container. Another point is that the edible liquid serves as a useful carrier for the ascorbic acid and for such flavoring agents as may be desired. It is also to be noted that if, during the mild heat treatment, any nutrient materials are leached out of the food units by the edible liquid, these nutrients remain within the container and are available for consumption together with the solid food units when the container is eventually opened. It is thus evident that no loss of nutrients occurs in the mild heat treatment in accordance with this invention.

In the step of adding the edible liquid to the raw food units, it is preferred that this liquid be added hot, that is, at about 180-212° F. By this technique the heat treatment is accomplished rapidly and inactivation of only the enzymes in the surface layers of the food is assured. Thus by using an inititally hot liquid and then maintaining the temperature of the liquid for a short period of time, the heating effect of the liquid is mainly directed to the surface of the food units—the interior portions of the food units cannot become heated in this limited period. By contract if the liquid were to be added at room temperature and the food and liquid in the container heated, the heating effect would be applied throughout the food units because the temperature would tend to equalize throughout the container. It is thus evident that application of a hot liquid to the food units gives the advantage that a surface-localized heating effect is obtained with the result that the enzymes in the surface layers of the food are inactivated whereas in the sub-surface portions of the food the tissue retains active enzymes and retains its raw, uncooked condition.

In packing the food in containers which may be hermetically sealed, addition of an initially hot edible liquid to the food has the further advantage that the vapor from the hot liquid will displace at least part of the air in the headspace of the container so that the sealed container will contain less air than if the liquid were cold. It is is evident that if desired the containers may be sealed under vacuum or under positive pressure of an inert gas such as nitrogen to completely eliminate air from the container.

The invention is further demonstrated by the following example:

*Example*

A. A lot of fresh Elberta peaches were washed, peeled, pitted, and sliced. The slices were packed into No. 2 enameled cans together with enough hot (185° F.) syrup to cover the slices. The syrup was an aqueous solution of sucrose (50%) which also contained 0.1% of ascorbic acid. The cans were sealed immediately after filling with fruit and syrup the cans being then immersed in a hot water bath (200° F.) and maintained therein for 3 minutes. The cans were then removed from the water bath and rotated slowly for about 3 minutes to ensure uniform heating of the fruit slices in the cans. It was estimated that in this heat treatment, because of the cooling effect of the fruit on the added hot syrup, the maximum temperature at the surface of the slices was about 150—175° F. The cans were then cooled by immersing in a bath of cold water. The cooled cans were then placed in a freezer to freeze the contents.

B. In another experiment the procedure of part A, above, was repeated except that in this case the syrup did not contain any ascorbic acid.

C. To provide a control—that is, a product made by conventional procedures, a lot of the peach slicees were placed in No. 2 enameled cans together with enough syrup to cover the slices. In this case the syrup was at room temperature; the composition of the syrup was the same as in part A. The cans were sealed immediately after filling with fruit and syrup and the cans were then placed in a freezer to freeze the contents.

A can from each lot (A, B, and C) was opened and the products subjected to organoleptic tests. It was found that all three products had a natural color, taste, and appearance. In particular it was noted that products A and B tasted like the fresh fruit; no cooked flavor could be detected.

As a further test, a can of each product was opened and the product dumped into an open pan. The products were allowed to stand in the open pans at room temperature and the color of each observed from time to time. It was noted that product A retained its fresh natural color for a long period and brown spots appeared only after 7 to 8 hours' standing in the open. In the case of product B, the slices turned a somewhat grayish color in about an hour. In the case of product C (control) the slices turned brown in 30 minutes.

To determine the resistance of the various products to browning on storage, several cans of each product were stored in a refrigerator at 25° F. It is to be noted that this temperature is well above that recommended for storing frozen foods (0° F.). Some of the cans were withdrawn from the 25° F. storage at selected time intervals and the products were examined. This examination included a count of the number of brown pieces in the can and an analysis of the syrup to determine the amount of ascorbic acid therein. Measurement of the ascorbic acid content furnishes an index of enzyme action which has taken place because such action results in a loss of ascorbic acid.

The results obtained are set forth in the following table:

| Product | Period of storage at 25° F., days | Number of brown slices per can [1] | Ascorbic acid, mg. per 100 ml. syrup |
|---|---|---|---|
| A | 3 | 0 | 52 |
| B | 3 | 0 | |
| C (control) | 3 | 4 | 54 |
| A | 6 | 0 | 55 |
| B | 6 | 0 | |
| C (control) | 6 | 5 | 51 |
| A | 12 | 0 | 54 |
| B | 12 | 0 | |
| C (control) | 12 | 5 | 38 |
| A | 26 | 0 | 55 |
| B | 26 | 3 | |
| C (control) | 26 | 5 | 34 |
| A | 45 | 0 | 54 |
| B | 45 | 3 | |
| C (control) | 45 | 5 | 33 |

[1] Total number of slices per can was 14.

Having thus described the invention, what is claimed is:

1. A method of preserving a solid perishable food, selected from the group consisting of fruits and vegetables, which comprises heating the food at a temperature and for a time sufficient to inactivate the enzymes in the surface layers of the food but not sufficient to completely inactivate the enzymes throughout the food, nor sufficient to sterilize the food, and not sufficient to cook the food, thereafter freezing the food, and maintaining it in frozen storage.

2. A method for preserving a solid perishable food, selected from the group consisting of fruits and vegetables, which comprises heating the food through the medium of an edible liquid in contact with the food, the heating being at a temperature and for a time sufficient to inactivate the enzymes in the surface layers of the food but not sufficient to completely inactivate the enzymes throughout the food, nor sufficient to sterilize the food, and not sufficient to cook the food, thereafter freezing the food and maintaining it in frozen storage.

3. A method of preserving foods which comprises introducing units of raw solid food, selected from the group consisting of fruits and vegetables, into a container, adding an edible liquid at about its boiling point to the container, subjecting the container and its contents to agitation to obtain intimate contact between the units of solid food and the hot liquid whereby to heat-inactivate the enzymes in the surface layers of the food units but not to completely inactivate the enzymes throughout the food, nor to sterilize the food and not sufficient to cook the food, thereafter subjecting the container and its contents to freezing and maintaining them in frozen storage.

4. The method of claim 3 wherein the food is a fruit.

5. A method of preserving fruit which comprises introducing units of raw solid fruit and a hot aqueous liquid containing sugar and ascorbic acid into a container, sealing the container to provide a gas- and liquid-tight enclosure about the fruit and liquid, heating the fruit by contact with the liquid maintained at a temperature from about 150° to about 212° F., said heating being continued for a time, within the range from about 10 seconds to about 10 minutes, sufficient to inactivate the enzymes in the surface layers of the fruit units but not sufficient to completely inactivate the enzymes throughout the fruit, nor sufficient to sterilize the fruit, and not sufficient to cook the fruit, then cooling the container and its contents, thereafter subjecting the container and its contents to freezing and maintaining them in frozen storage.

6. The method of claim 5 wherein the heating is effectuated by the heat content of the added aqueous liquid.

7. The method of claim 5 wherein the heating is effectuated by the heat content of the added aqueous liquid supplemented by heat applied to the exterior of the container.

References Cited in the file of this patent
UNITED STATES PATENTS

| | | |
|---|---|---|
| 1,955,484 | Birdseye | Apr. 17, 1934 |
| 2,364,049 | Bensel | Dec. 5, 1944 |
| 2,437,859 | Moulthrop | Mar. 16, 1948 |
| 2,474,650 | Birdeye | June 28, 1949 |
| 2,479,171 | Lamperti | Aug. 16, 1949 |